United States Patent [19]

Gaulding et al.

[11] Patent Number: 4,702,653
[45] Date of Patent: Oct. 27, 1987

[54] CAPTIVE CROSS MEMBER SYSTEM FOR RESTRAINING MOVEMENT OF LADING

[75] Inventors: William R. Gaulding, Littleton, Colo.; William D. Smith; Nicholas C. Marsh, both of Topeka, Kans.

[73] Assignee: The Atchison, Topeka and Santa Fe Railway Company, Chicago, Ill.

[21] Appl. No.: 709,055

[22] Filed: Mar. 7, 1985

[51] Int. Cl.$^4$ .............................................. B61D 45/00
[52] U.S. Cl. .................................... 410/144; 410/150; 410/152; 403/254
[58] Field of Search ............... 410/129, 130, 131, 132, 410/133, 143, 144, 150, 151, 152, 135, 149, 126; 403/254, 255, 252

[56] References Cited

U.S. PATENT DOCUMENTS

| 1,215,892 | 2/1917 | Watts | 410/133 X |
|---|---|---|---|
| 1,755,729 | 4/1930 | Goetz | 410/126 |
| 3,130,690 | 4/1964 | Johnston | 410/144 |
| 3,369,502 | 2/1968 | Breen et al. | 410/133 |

FOREIGN PATENT DOCUMENTS 7712422 11/1977 Netherlands .................. 403/254

OTHER PUBLICATIONS

"How to Use Evans DF Equipment", by Evans Products Company (Form No. 67-13).
"DF Trailer/Container I ᚋd-Bracing Equipment", brochure from Evans Industrial Division, Plymouth, Michigan, Bearing No. PN 690601.
"DF Truck/Container Equipment", pp. 1–11, by Evans Products Company, Bearing Aeroquip Designation on p. 11.

Primary Examiner—Robert B. Reeves
Assistant Examiner—Glenn Foster
Attorney, Agent, or Firm—Willian Brinks Olds Hofer Gilson & Lione Ltd.

[57] ABSTRACT

A system to prevent longitudinal lading movement in trailers, containers, boxcars or other freight transport vehicles. A captive crossbar is used to restrain the lading. One end of the crossbar is captured in a guide channel attached to a wall of the transport vehicle. Once the transport vehicle is loaded, a roller device on the captive end of the crossbar enables the operator to position the crossbar along the guide channel easily. The crossbar is then pivoted about the roller assembly to span the loading region of the transport vehicle. As the crossbar is rotated, locking elements on each end of the crossbar engage respective lock receiving apertures defined on each vehicle wall. When the crossbar is not in use it may be stowed within the guide channel, permitting free access to the loading region of the vehicle for the loading and unloading of freight.

13 Claims, 7 Drawing Figures

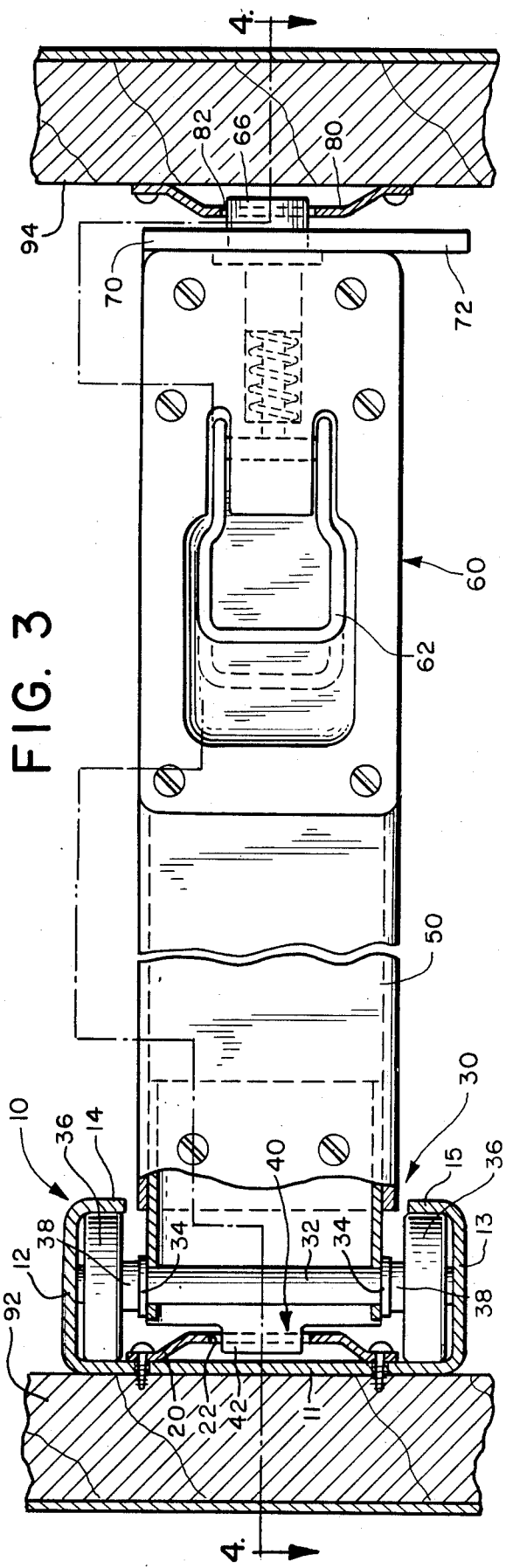
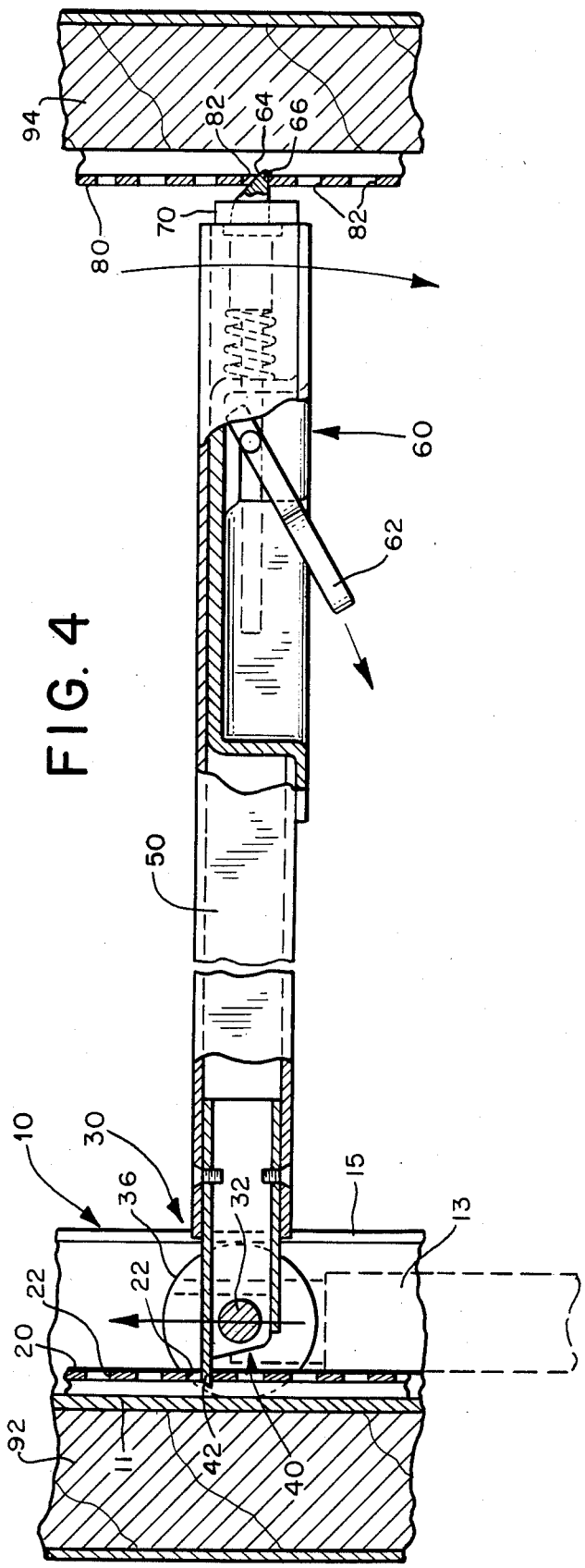

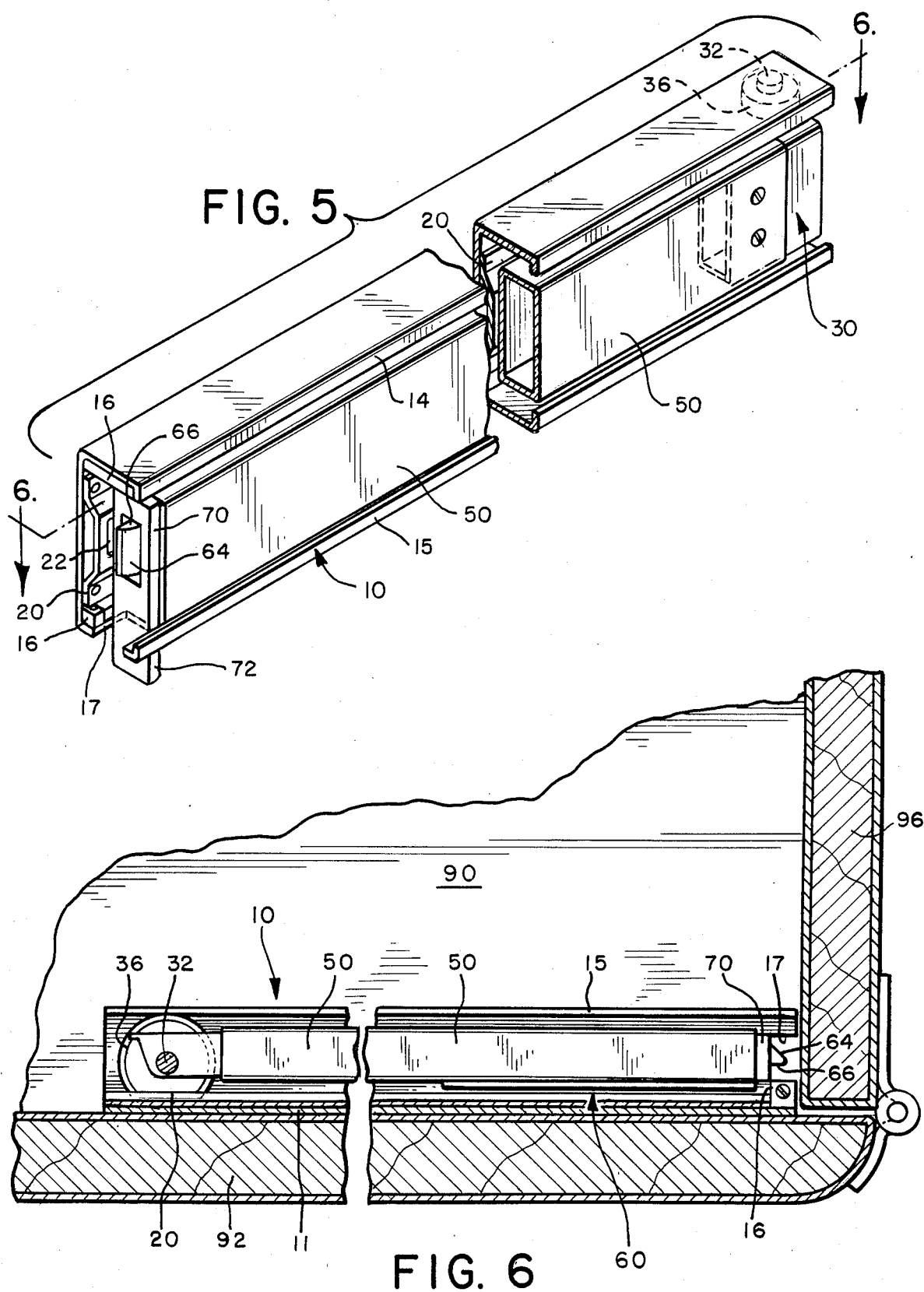

CAPTIVE CROSS MEMBER SYSTEM FOR RESTRAINING MOVEMENT OF LADING

BACKGROUND OF THE INVENTION

The present invention relates to a device for preventing the movement of lading in trailers, containers, boxcars or other freight transport vehicles.

The movement of lading during transit can result in damage to the shipment as well as damage to the transport vehicle. To prevent such damage, dunnage free bars have been developed to restrain the lading. However, one commonly used bar has not been totally satisfactory because it is not designed to remain with the transport vehicle and so was often lost or misplaced. Furthermore, the attachment of such bars to the transport vehicle, and the bars themselves, are often of insufficient strength to ensure lading restraint throughout the transit.

SUMMARY OF THE INVENTION

The present invention is directed to a captive device to prevent lading movement in a freight transport vehicle.

According to this invention, a crossbar, of sufficient length to span the loading region of a transport vehicle, is used to restrain the lading. A guide, secured longitudinally to a wall of the transport vehicle, captures the crossbar and retains it to prevent misplacement. A pivot assembly at the captive end of the crossbar facilitates the positioning of the crossbar along the guide and is used when adjusting the crossbar for differing freight requirements.

Once the captive end of the crossbar is positioned, the pivot assembly allows the crossbar to be pivoted about its captive end so that the crossbar spans the loading region of the transport vehicle. As the crossbar is swung into its restraining position, locking elements on each end of the crossbar engage respective lock receiving elements which are secured to opposing walls of the transport vehicle. The crossbar and the locking mechanisms are of sufficient strength to restrain the lading against movement.

One important advantage of the preferred embodiment described below is that the crossbar is captive and retained with the transport vehicle. Furthermore, when the crossbar is not in use it may be stowed in a nonobstructive position, thereby freeing the loading region for the loading and unloading of freight.

Another particular advantage of the preferred embodiment described below is the ease with which the crossbar system can be operated. Since the crossbar is captive and supported by rollers at one end, the full weight of the crossbar does not have to be controlled by the operator, and the bar may easily be positioned.

A further advantage of this embodiment is that it complies with AAR requirement C/R 43-A and other applicable operating specifications for the prevention of excessive loads on the rear doors of trailers or containers. These requirements are outlined in AAR specification M-931-79. Additionally, the present invention furthers compliance with such regulations by keeping the load restraining device attached to the vehicle, thereby preventing its loss and ensuring its availability when needed.

The invention itself, together with further objects and attendant advantages, will best be understood by reference to the following detailed description, taken in conjunction with the accompanying drawings.

BRIEF DESCRIPTION OF THE DRAWINGS

FIG. 3 is a cross-sectional view taken along line 3—3 of FIGS. 2a and 2b.

FIG. 4 is a cross-sectional view taken along line 4—4 of FIG. 3.

FIG. 5 is a perspective view showing the embodiment of FIG. 1 positioned in a storage position, with the crossbar received within the guide channel.

FIG. 6 is a longitudinal sectional view taken along line 6—6 of FIG. 5.

DETAILED DESCRIPTION OF THE PRESENTLY PREFERRED EMBODIMENTS

Figure 1:
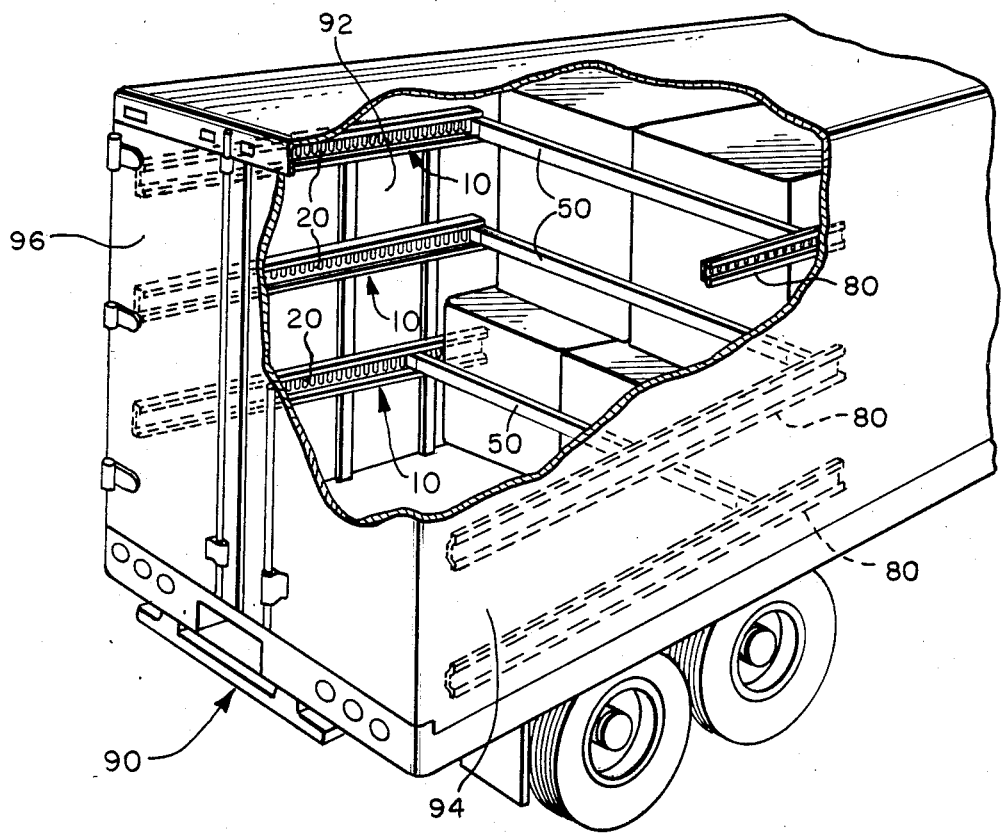
FIG. 1 is a perspective view in partial cutaway of a freight transport vehicle on which is mounted three examples of the presently preferred embodiment of this invention.
Figure 2A:
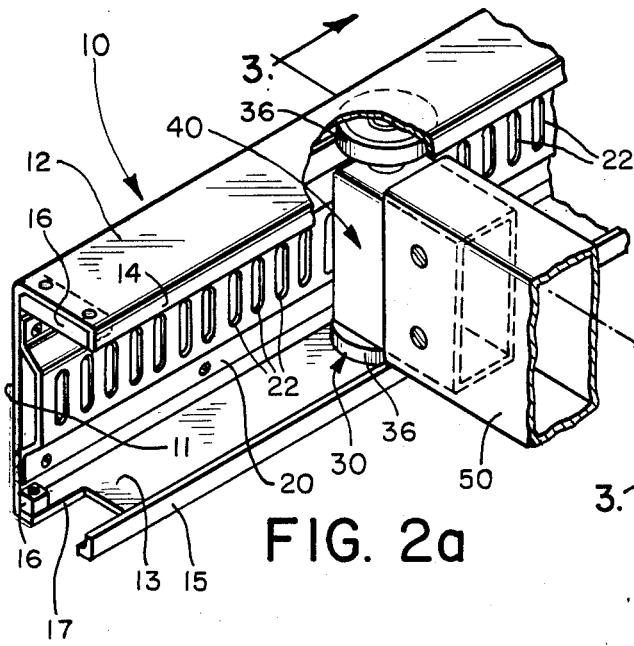
FIGS. 2a and 2b are perspective views of first and second ends of the preferred embodiment of FIG. 1.
Figure 2B:
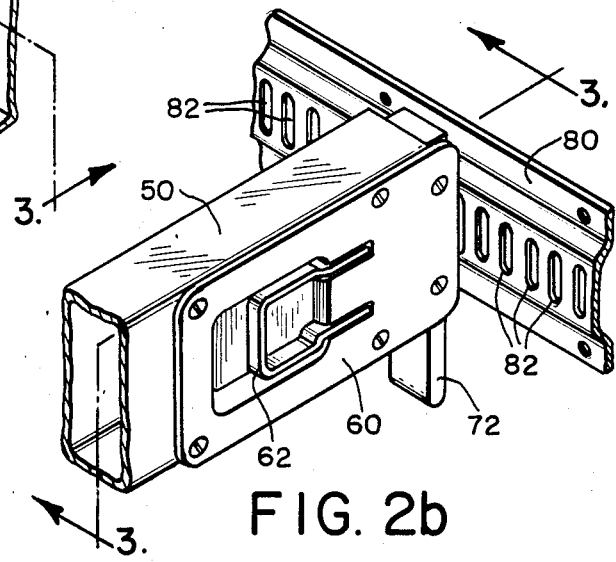

With reference to the drawings, FIG. 1 shows three examples of a presently preferred embodiment of the cross-member system of the present invention, installed in a transport vehicle 90. This presently preferred embodiment comprises three major assemblies: a guide channel assembly 10 which includes a first slotted belt rail 20; a crossbar 50 which includes a first latch assembly 40 and pivot assembly 30 at one end and a second retractable latch assembly 60 at the opposite end; and a second slotted belt rail 80.

More detailed views of the first latch assembly 40 and the pivot assembly 30, captured in the guide channel 10, are shown in FIGS. 2a, 2b, 3 and 4. The guide channel 10 is a steel channel mounted horizontally on one wall 92 of the transport vehicle 90 and shaped to capture and guide the pivot assembly 30. In this embodiment, the guide channel 10 defines five panels 11-15. The first panel 11 forms the back of the guide channel 10. The second and third panels 12, 13 are oriented parallel to each other and form the top and bottom of the guide channel 10. The fourth and fifth panels 14, 15 are substantially narrower than the first panel 11 and form the front face of the guide channel 10. The fourth panel 14 extends downwardly from the top panel 12, parallel to the back panel 11; similarly, the fifth panel 15 extends upwardly from the bottom panel 13, also parallel to the back panel 11. These panels 11-15 therey form a nest within which the pivot assembly 30 resides, and the separation between the fourth and fifth panels 14, 15 creates a substantially open face through which the crossbar 50 may extend. The guide channel 10 guides, supports and captures the pivot assembly 30. If constructed into the wall of the vehicle, the guide channel 10 may become a permanent part of the structure.

Roller stops 16 are removably attached to at least the rearward end of the guide channel 10 to prevent the pivot assembly 30 from leaving the guide channel 10. The stops 16 of the preferred embodiment are attached to the guide channel 10 with countersunk screws so that the crossbar 50 may be removed for maintenance. A notch 17, also located at the rearward end of the guide channel 10, is used to secure the crossbar 50 within the guide channel 10 during storage, as described below in conjunction with FIGS. 5 and 6.

The first slotted belt rail 20 is fastened to the inside face of the first panel 11 of the guide channel 10 and defines a plurality of slots 22 for receiving a locking tang 42 included in the first latch assembly 40.

As explained above, the pivot assembly 30 is captured by the guide channel 10. In this embodiment, the pivot assembly 30 includes a shaft 32 which passes through the body of the first latch assembly 40. Snap rings 34 are positioned on each end of the shaft 32 to hold the shaft 32 in place. Steel rollers 36 are rotatably mounted to each end of the shaft 32 by means of sealed bearings 38. When the pivot assembly 30 is installed within the guide channel 10, the pivot assembly 30 facilitates positioning of the crossbar 50 along the length of the guide channel 10 and acts as a pivot to guide rotation of the crossbar 50.

The first latch assembly 40 is mounted to one end of the crossbar 50 near the pivot assembly 30. In this embodiment, the first latch assembly 40 comprises a fixed steel tang 42 which protrudes from the end of the first latch assembly 40, opposite the crossbar 50, in a direction parallel to the longitudinal axis of the crossbar 50. When the tang 42 is engaged with one of the slots 22 of the first belt rail 20, translational movement of the crossbar 50 along the guide channel 10 is prevented.

A second latch assembly 60 is mounted to the free end of the crossbar 50. In this embodiment, the second latch assembly includes a retractable, spring loaded latch member 66. The engaging face 64 of the latch member 66 is beveled to facilitate engagement with the slots 82 of the second belt rail 80, which is mounted on the vehicle wall 94 opposite the first belt rail 20 and aligned therewith. A recessed releasing handle 62 is provided for retracting the spring loaded latch 66 from an engaged slot 82 and is mounted flush with the face of the crossbar 50.

An end plate 70 is mounted on the end of the second latch assembly 60 and defines an aperture through which the latch member 66 passes. The end plate 70 also defines a catch handle 72 which extends in a direction perpendicular to the longitudinal axis of the crossbar 50. The catch handle 72 is used when manipulating the crossbar 50 and also secures the crossbar 50 for storage within the guide channel 10 when the catch handle 72 is engaged in notch 17, as shown in FIG. 5.

In operation, the crossbar 50 is stored within the guide channel 10 when not in use, as shown in FIGS. 5 and 6. To use the crossbar 50 to restrain lading within the transport vehicle 90, the crossbar 50 is removed from its storage position within the guide channel 10 by grasping the catch handle 72 and pulling rearwardly. The crossbar 50 is then positioned along the guide channel 10, such that the tang 42 is substantially aligned with a desired slot 22 of the first belt rail 20. The crossbar 50 is then rotated about the pivot assembly 30 to the position of FIGS. 1-4, thereby causing the protruding steel tang 42 of the first latch assembly 40 to engage the aligned slot 22 of the first slotted belt rail 20, as best illustrated in FIGS. 3 and 4. Once the tang 42 is engaged, further translational movement of the crossbar 50 along the guide channel 10 is prevented. As the rotation of the crossbar 50 is continued, the spring loaded latch member 66, located on the free end of the crossbar 50, automatically engages a slot 82 of the second belt rail 80 as the crossbar 50 approaches its perpendicular position as shown in FIGS. 3 and 4. Although the latch member 66 will engage several slots 82 of the second belt rail 80, the best restraining capabilities are realized when the crossbar 50 is positioned perpendicular to both transport vehicle walls 92, 94. Visual inspection of the end plate 70 with respect to the second belt rail 80 is sufficient to assure proper positioning.

To unlock the crossbar 50 for repositioning or for unloading freight, the operator can manipulate the recessed releasing handle 62 with one hand while the other hand is held against the crossbar 50 to protect against any excess load induced by a lading shift. Once unlocked, a swinging motion of the crossbar 50 rearwardly will disengage the tang 42 at the captive end of the crossbar 50. When the crossbar 50 is not in use, it is again stowed with the catch handle 72 of the end plate 70 in the notch 17 located at the rearward end of the guide channel 10 as shown in FIGS. 5 and 6. This storage position assures that there will be no protruding parts to damage the lading or to interfere with loading and unloading operations. The crossbar 50 is held in this storage position by pressure of the closed transport vehicle door 96 against the end plate 70.

The following information is provided in order to define the presently preferred embodiment of this invention in greater detail. It should be clearly understood that this information is provided only by way of example, and is not intended in any way to limit the scope of this invention. In the preferred embodiment described above, the belt rails 20, 80 are Slimline slotted belt rails obtained from Evans Products Co. of Plymouth, Mich. The crossbar 50 of this preferred embodiment is formed of a tubular steel (ASTM A500 grade B or equivalent) having outside cross-sectional dimensions of 2 inches by 4 inches, and a wall thickness of 3/16 inch. The length of this steel bar is selected to span the width of the transport vehicle. The second latch assembly 60 used in this preferred embodiment includes a bolt shaped to slam shut and having a stroke of $\frac{1}{2}$ inch. The recessed handle is spring biased to the retracted position, even as the bolt retracts as the crossbar is slammed shut. The guide channel is formed of $\frac{1}{8}$ inch thick 1035 steel or equivalent, and is bent to shape.

The preferred embodiment of the present invention is relatively maintenance free. However the pivot assembly 30, the latch assemblies 40, 60, and the belt rails 20, 80 should be checked for wear periodically and replaced accordingly. It should be understood that materials or components different from those used in the preferred embodiment may be selected to reduce the weight or the cost or to enhance the wear characteristics of any component. The system of the preferred embodiment may also be modified to accommodate particular freight or the system may be installed at varying heights depending upon the lading requirements. The crossbar 50 may also be constructed of two concentric tubes with a means for locking the tubes at a plurality of positions such that the length of the crossbar 50 may be readily adjusted. Additionally, the pivot assembly 30 and latch assemblies 40, 60 may be altered to accommodate particular lading requirements or availability of components. In particular, not all embodiments of the pivot assembly include rollers. An alternative to the guide channel 10 is to use a guide bar. The function of the guide bar is analogous to that of the guide channel 10 except that the pivot assembly 30 is captured to the outside of the bar rather than enclosed by a channel. As shown in FIG. 1, a number of guide channels 10 may be installed on the transport vehicle wall to provide vertical height adjustment of a crossbar 50 or to accommodate a plurality of crossbars 50.

The foregoing detailed description has been given for illustrative purposes only. A wide range of changes and modifications can be made to the preferred embodiments described above. It should therefore be understood that it is the following claims, including all equivalents, which are intended to define the scope of this invention.

We claim:

1. A captive cross-member system for preventing lading movement in a freight transport vehicle of the type having first and second walls defining a loading region therebetween, said system compising:
    a crossbar of length substantially equal to the width of said loading region;
    a guide channel mounted to one of said walls;
    a first latch assembly mounted on a first end of said crossbar and comprising a first latch member extending parallel to the longitudinal axis of said crossbar;
    a pivot assembly mounted to said crossbar at said first end; said pivot assembly guiding rotational movement of said crossbar in said guide channel about an axis defined by said pivot assembly;
    said guide channel comprising means for capturing and guiding said pivot assembly along the longitudinal axis of said guide channel in a predetermined relation to the guide channel;
    a first latch receiving rail mounted parallel to said guide channel and defining a plurality of first latch receiving apertures shaped to accommodate said first latch member; said first latch receiving rail and said guide channel operable to engage said first latch member with an aligned one of said first latch receiving apertures upon rotation of said crossbar to a locked position extending substantially outwardly from said guide channel; said first latch member cooperating during engagement with said aligned one of said first latch receiving apertures to prevent translational movement of said crossbar along said guide channel; said first latch receiving rail and said guide channel further operable to disengage said first latch member from said aligned one of said first latch receiving apertures upon rotation of said crossbar to a released position substantially aligned with said guide channel;
    a second latch assembly mounted to a second end of said crossbar, opposite said first end; said second latch assembly comprising a retractable second latch member and a latch release mechanism operative to retract said second latch member;
    a second latch receiving rail mounted to the other of said vehicle walls opposite said first latch receiving rail; said second latch receiving rail defining a plurality of second latch receiving apertures shaped to accommodate said second latch member when said crossbar is in the substantially locked position and to substantially prevent any motion of said crossbar with respect to said vehicle walls; and
    a locking element located on at least one of said crossbar and said guide to engage the other of said crossbar and said guide so as to secure said crossbar in a position substantially aligned with and at least partially received within said guide channel.

2. The captive cross-member system of claim 1 wherein said pivot assembly comprises:
    a shaft passing through said crossbar;
    a first roller rotatably mounted to one end of said shaft and captured in said guide channel; and
    a second roller rotatably mounted to the other end of said shaft and captured in said guide channel.

3. The captive cross-member system of claim 2 wherein said means for securing said crossbar to said guide channel comprises:
    a notch located on said one end of said guide channel; and
    a catch handle mounted to said crossbar and shaped and positioned to engage said notch; said catch handle extending beyond the edge of said second latch assembly; said catch handle and said notch cooperating during engagement of said catch handle with said notch to prevent rotation of said crossbar into said loading region.

4. The captive cross-member system of claim 1 wherein said latch release mechanism is recessed substantially flush with the face of said crossbar.

5. The captive cross-member system of claim 1 wherein said guide channel comprises at least one roller stop mounted adjacent one end of said guide channel to prevent said pivot assembly from moving out of said guide channel.

6. The captive cross-member system of claim 1 wherein said first latch member is integral with said first latch assembly.

7. The captive cross-member system of claim 1 wherein said first latch member is fixedly mounted with respect to the first latch assembly.

8. The captive cross-member system of claim 1 wherein said first latch member automatically engages an aligned one of said first latch receiving apertures upon rotation of said crossbar to a locked position and wherein said first latch member automatically disengages from an aligned one of said first latch receiving apertures upon rotation of said crossbar to a released position.

9. A restraining device for a captive cross-member system for the prevention of lading movement in a freight transport vehicle, of the type having first and second walls defining a loading region therebetween, said system comprising a guide, and a plurality of first locking elements mounted to said first wall, and a plurality of second locking elements mounted to said second wall opposite said first wall, said restraining device comprising:
    a crossbar of length substantially equal to the width of said loading region and defining first and second ends;
    a pivot assembly mounted to said crossbar at said first end; said pivot assembly adapted to be captured by the guide and confined in a predetermined configuration relative to the first locking elements; said pivot assembly further adapted to guide rotational movement of said crossbar with respect to said guide about an axis defined by said pivot assembly;
    a lock engaging element on said crossbar at said first end; said lock engaging element operative to automatically engage an aligned one of said first locking elements upon rotation of said crossbar to a locked position extending substantially outwardly from said guide; said lock engaging element cooperating during engagement with said aligned one of said first locking elements to prevent translational movement of said crossbar along said guide; said lock engaging element further operative to automatically disengage from said first locking elements upon rotation of said crossbar to a released position substantially aligned with said guide; and
    a releaseable locking element to releaseably lock said second end of said crossbar to an aligned one of said plurality of second locking elements to prevent rotation of said crossbar about said pivot assembly and to fix the position of said crossbar relative to said guide.

10. The restraining device of claim 9 wherein said pivot assembly comprises:
   a shaft passing through said first end;
   a first roller rotatably mounted to one end of said shaft; and
   a second roller rotatably mounted to the other end of said shaft.

11. The restraining device of claim 9 wherein said lock engaging element is integral with said crossbar.

12. A restraining device of claim 9 wherein said lock engaging element is fixedly mounted with respect to the crossbar.

13. A captive cross-member system for preventing movement of lading in a freight transport vehicle of the type having first and second walls defining a loading region therebetween, said system comprising:
   a crossbar of length substantially equal to the width of said loading region;
   a guide channel mounted to one of said walls;
   a first latch assembly mounted on a first end of said crossbar and comprising a first latch member extending parallel to the longitudinal axis of said crossbar;
   a pivot assembly mounted to said crossbar at said first end, said pivot assembly guiding rotational movement of said crossbar in said guide channel about an axis defined by said pivot assembly, the pivot assembly permitting rotation in a clockwise and a counterclockwise direction;
   said guide channel comprising means for capturing and guiding said pivot assembly along the longitudinal axis of said guide channel;
   a first latch receiving rail mounted parallel to said guide channel and defining a plurality of first latch receiving apertures shaped to accommodate said first latch member, said first latch receiving rail and said guide channel operable to engage said first latch member with an aligned one of said first latch receiving apertures by means of (1) rotational movement of said crossbar about said axis in any direction permitted by said pivot assembly relative to an axis perpendicular to the guide channel and (2) translational movement of said crossbar along said guide channel such that said crossbar is manipulated to a locked position extending substantially outwardly from said guide channel, said first latch member cooperating during engagement with as aligned one of said first latch receiving apertures to prevent translational movement of said crossbar along said guide channel, said first latch receiving rail and said guide channel further operable to disengage said first latch member from said aligned one of said first latch receiving apertures by means of (1) rotational movement of said crossbar about said axis in any direction permitted by said pivot assembly relative to an axis perpendicular to the guide channel and (2) translational movement of said crossbar along said guide channel such that said crossbar is manipulated to a released position wherein said crossbar is substantially aligned with said guide channel;
   a second latch assembly mounted to a second end of said crossbar opposite said first end, said second latch assembly comprising a retractable second latch member and a latch release mechanism operative to retract said second latch member;
   a second latch receiving rail mounted to the other of said vehicle walls opposite said first latch receiving rail, said second latch receiving rail defining a plurality of second latch receiving apertures shaped to accommodate said second latch member when said crossbar is in the substantially locked position and to substantially prevent any motion of said crossbar with respect to said vehicle walls; and
   means for securing said crossbar substantially aligned with and at least partially received within said guide channel to hold said crossbar substantially out of said loading region.

* * * * *

UNITED STATES PATENT AND TRADEMARK OFFICE
CERTIFICATE OF CORRECTION

PATENT NO. : 4,702,653
DATED : October 27, 1987
INVENTOR(S) : William R. Gaulding et al.

It is certified that error appears in the above-identified patent and that said Letters Patent is hereby corrected as shown below:

IN THE DETAILED DESCRIPTION OF THE
PRESENTLY PREFERRED EMOBIDIMENTS

In column 2, line 49, please delete "therey" and substitute therefor --thereby--.

IN THE CLAIMS

In Claim 13 (column 8, line 10), please delete "as aligned" and substitute therefor --said aligned--.

Signed and Sealed this

Eighteenth Day of October, 1988

Attest:

DONALD J. QUIGG

Attesting Officer

Commissioner of Patents and Trademarks